United States Patent
Liao et al.

(10) Patent No.: US 8,100,441 B2
(45) Date of Patent: Jan. 24, 2012

(54) ELECTRONIC DEVICE AND ITS LATCH STRUCTURE

(75) Inventors: Wen-Chieh Liao, Guanyin Township, Taoyuan County (TW); Wei-Cheng Wang, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 298 days.

(21) Appl. No.: 12/461,191

(22) Filed: Aug. 4, 2009

(65) Prior Publication Data
US 2010/0259140 A1 Oct. 14, 2010

(30) Foreign Application Priority Data
Apr. 9, 2009 (TW) .............................. 98205779 U

(51) Int. Cl.
*E05C 19/10* (2006.01)
(52) U.S. Cl. ................ 292/99; 292/341.15; 292/341.17; 292/300; 361/679.43
(58) Field of Classification Search ................... 292/300, 292/302, 303, 332–335, DIG. 4, DIG. 37; 361/679.57, 679.58
See application file for complete search history.

(56) References Cited

U.S. PATENT DOCUMENTS

| | | | | |
|---|---|---|---|---|
| 4,230,921 A * | 10/1980 | Wearing et al. | ............... | 200/526 |
| 4,408,109 A * | 10/1983 | Nat | ................ | 200/523 |
| 4,636,601 A * | 1/1987 | Tanabe | ............... | 200/524 |
| 4,736,081 A * | 4/1988 | Sorrells | ................ | 200/525 |
| 4,917,416 A * | 4/1990 | Westphal et al. | ............. | 292/175 |
| 5,090,751 A * | 2/1992 | Kobayashi | ............... | 292/71 |
| 5,217,262 A * | 6/1993 | Kurosaki | ............... | 292/6 |
| 5,498,039 A * | 3/1996 | Bivens | ................ | 292/145 |
| 5,657,969 A * | 8/1997 | Bivens | ............... | 267/64.12 |
| 5,818,691 A * | 10/1998 | McMahan et al. | ........ | 361/679.43 |
| 6,056,333 A * | 5/2000 | Wach | ............... | 292/145 |
| 6,247,733 B1 * | 6/2001 | Weiland | ................ | 292/228 |
| 6,491,086 B2 * | 12/2002 | Bettio et al. | ............... | 160/290.1 |
| 6,565,167 B1 * | 5/2003 | Miller et al. | ............... | 312/332.1 |
| 6,669,248 B2 * | 12/2003 | Shirase | ............... | 292/300 |
| 6,808,214 B2 * | 10/2004 | Sato et al. | ............... | 292/341.15 |
| 7,097,220 B2 * | 8/2006 | Haba | ............... | 292/341 |
| 7,108,298 B2 * | 9/2006 | Huet et al. | ............... | 292/6 |
| 7,303,216 B2 * | 12/2007 | Bella et al. | ............... | 292/303 |
| 7,393,026 B2 * | 7/2008 | Ikeda et al. | ............... | 292/341.15 |
| 7,637,544 B2 * | 12/2009 | Liang et al. | ............... | 292/338 |
| 7,740,166 B2 * | 6/2010 | Takeuchi | ............... | 235/375 |
| 7,964,814 B2 * | 6/2011 | Nakase et al. | ............... | 200/345 |
| 2003/0011972 A1 * | 1/2003 | Koo | ............... | 361/681 |
| 2003/0062730 A1 * | 4/2003 | Shirase | ............... | 292/300 |
| 2007/0235312 A1 * | 10/2007 | Takeuchi | ............... | 200/520 |
| 2008/0000763 A1 * | 1/2008 | Cove | ............... | 200/314 |
| 2009/0149044 A1 * | 6/2009 | Lee et al. | ............... | 439/79 |
| 2009/0308724 A1 * | 12/2009 | Nakase et al. | ............... | 200/345 |

* cited by examiner

*Primary Examiner* — Thomas Beach
*Assistant Examiner* — Sajid R Ansari
(74) *Attorney, Agent, or Firm* — Rabin & Berdo, PC

(57) ABSTRACT

An electronic device and its push-lock and push-release type of latch structure are provided in the invention. The latch structure includes a platform, an elastic restorable element connected to the platform, and two side bases respectively disposed on two opposite edges of the platform. Each of the side bases has a base body having a loop track with a stopper, a driven element movably disposed on the base body and movable with the platform, and a "U" type rod pivotally connected to the driven element at one end thereof and extending into the loop track at another end thereof.

15 Claims, 4 Drawing Sheets

ELECTRONIC DEVICE AND ITS LATCH STRUCTURE

RELATED APPLICATIONS

This application claims priority to Taiwan Application Serial Number 98205779, filed Apr. 9, 2009, which is herein incorporated by reference.

BACKGROUND

1. Field of Invention

The present invention relates to a latch structure, more particularly to a push-lock and push-release type of latch structure from an electronic device.

2. Description of Related Art

A conventional push-lock and push-release type of a latch structure has a spring and a pushed block. The pushed block can be pushed to move along a travel path, and the spring is disposed on the way of the travel path. When the pushed block is pushed to move along the way of the travel path and then stayed in a fixing condition, the spring is compressed to store an elastic force. Then, after the pushed block is pushed again to release from the fixing condition, the pushed block is pushed back to an original location by the elastic force of the compressed spring.

However, since the spring is disposed on the way of the travel path of the pushed block, room at least for the compressed spring is needed to preserve in the pushed block's travel path, when the conventional push-lock and push-release type of a latch structure is in design. Thus, a length of the travel path of the pushed block cannot be decreased, and the size of the latch structure cannot be improved in effect.

SUMMARY

It is therefore an aspect of the present invention to provide a push-lock and push-release type of latch structure.

Accordingly, in a practice of the present invention, the latch structure comprises a platform, at least an elastic restorable element and plural side bases. The elastic restorable element is connected to the platform. The side bases are respectively disposed on two opposite edges of the platform. Each side base comprises a base body, a loop track, a driven element, and a "U" type rod. The loop track is disposed on the base body and the loop track has a stopper therein. The driven element is disposed between the platform and the base body, and the driven element is movable with the platform together. The "U" type rod is pivotally connected to the driven element at a first end thereof, and extending into the loop track at a second end thereof.

Therefore, when a user presses the platform from an original location, the driven element and the "U" type rod will be driven to move together, and the second end of the "U" type rod in the loop track will move along the loop track in which the "U" type rod will be rotated to meet the loop track for smoothly going along the loop track.

When the second end of the "U" type rod moves along the loop track to arrive at the stopper, the "U" type rod, the driven element and the platform are all fastened by the stopper.

After that, when the user presses the platform again, and the second end of the "U" type rod moves along the loop track to leave the stopper, the elastic restorable element carries the "U" type rod, the driven element and the platform all moving back to the original location.

According to an embodiment of the practice, the latch structure can be equipped in a space of a housing of an electronic device, and the elastic restorable element can be connected to the platform and the housing. Thus, an article can be disclosed on the platform or contained in the space, when the push-lock and push-release type of latch structure is manipulated.

It is to be understood that both the foregoing general description and the following detailed description are examples, and are intended to provide further explanation of the invention as claimed.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1A:
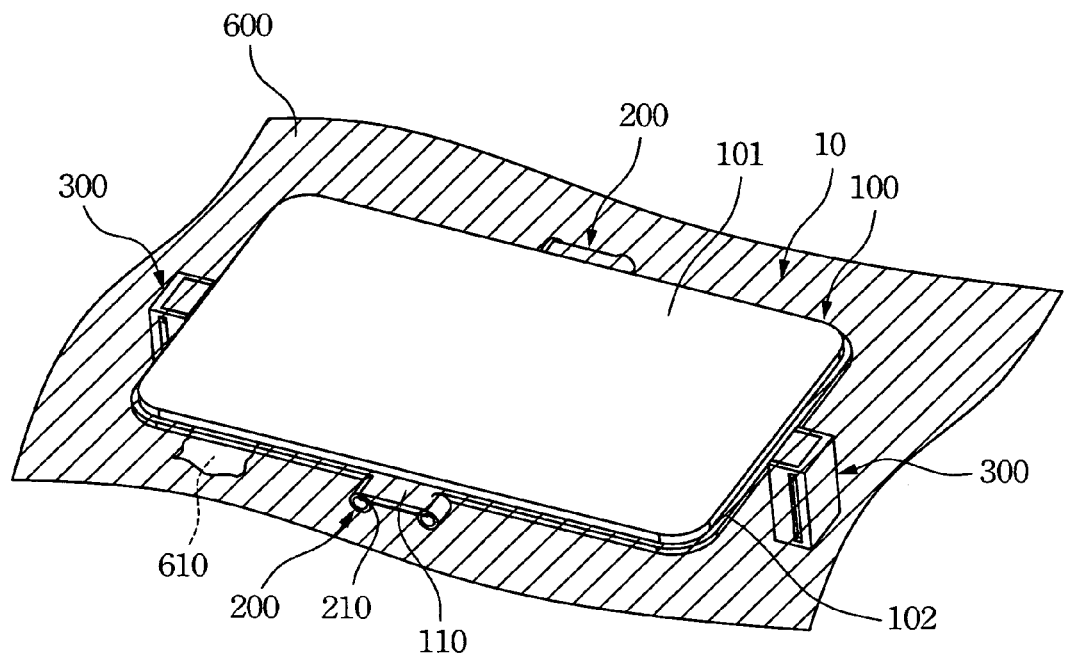
FIG. 1A is a perspective view of a practice of a push-lock and push-release type of latch structure of the present invention.

Reference will now be made in detail to the present preferred embodiments of the invention, examples of which are illustrated in the accompanying drawings. Wherever possible, the same reference numbers are used in the drawings and the description to refer to the same or like parts.

In the following descriptions of this specification, electronic device which is mentioned below can be a hand held electronic apparatus, such as Personal Digital Assistant (PDA), electronic translator, Notebook (NB), mobile phone or the like. Also, "push-lock and push-release type" of latch structure in the invention can be named as "push-push type", "push-lock and push-open type", or "alternate type" of latch structure.

Figure 1B:
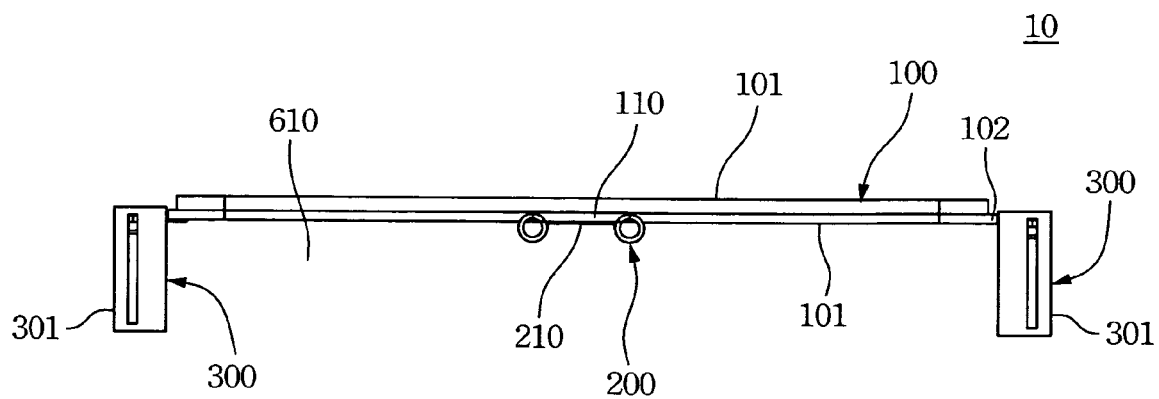
FIG. 1B is a side view of the practice of the latch structure of the present invention.

Refer to FIG. 1A and FIG. 1B. FIG. 1A and FIG. 1B are a perspective view and a side view of a practice of a push-lock and push-release type of the latch structure. The "push-lock and push-release type" of latch structure 10 at least comprises a platform 100, two elastic restorable elements 200 and two side bases 300. The platform 100 is disposed between the two side bases 300, and is physically connected to the elastic restorable elements 200.

When the platform 100 is pressed down from an original location, each elastic restorable element 200 is deformed to store an elastic force, and the platform 100 is fastened by the side bases 300. After that, when the platform 100 fastened by the side bases 300 is pressed down again, the elastic restorable element 200 carries the platform 100 back to the original location by the released elastic force.

In FIG. 1A, the latch structure 10 is equipped a space 610 formed on a housing 600 of an electronic device, Thus, an article such as an external auxiliary input device (e.g. mouse, remote etc., not shown) can be placed on the platform 100 to be contained or disclosed from the space 610, when the push-lock and push-release type of latch structure 10 is manipulated.

The elastic restorable element 200 is physically connected to a fixed element and the platform 100. In this specification, the so-called fixed element can be an element such as housing (see FIG. 1A) or the side base 300 (not shown), staying in a fixed condition while the platform 100 is in a traveling condition. The details of the elastic restorable element 200 will be further described as below.

In an embodiment of the practice, the platform 100 appears as a board structure having some edges 102. The platform 100 connects the side bases 300 by the edges 102 thereof, and a direction of a traveling path of the platform 100 is the same as a direction that one of the surfaces 101 of the platform 100 faces while the platform 100 is pressed between the side bases 300.

In addition, when the platform 100 is carried back to the original location by the elastic restorable element 200, the platform 100 is located on an opening of the space 610 and is co-planar with a surface of the housing 600 (see FIG. 1B), or the platform 100 is located in the space neighboring to an opening of the space 610 as long as the article placed on the platform 100 can be reached. Moreover, the surfaces 101 of the platform 100 are not limited in size, shape (e.g. rectangle or round shape), and functional design thereon (e.g. an article contained fillister).

Figure 2:
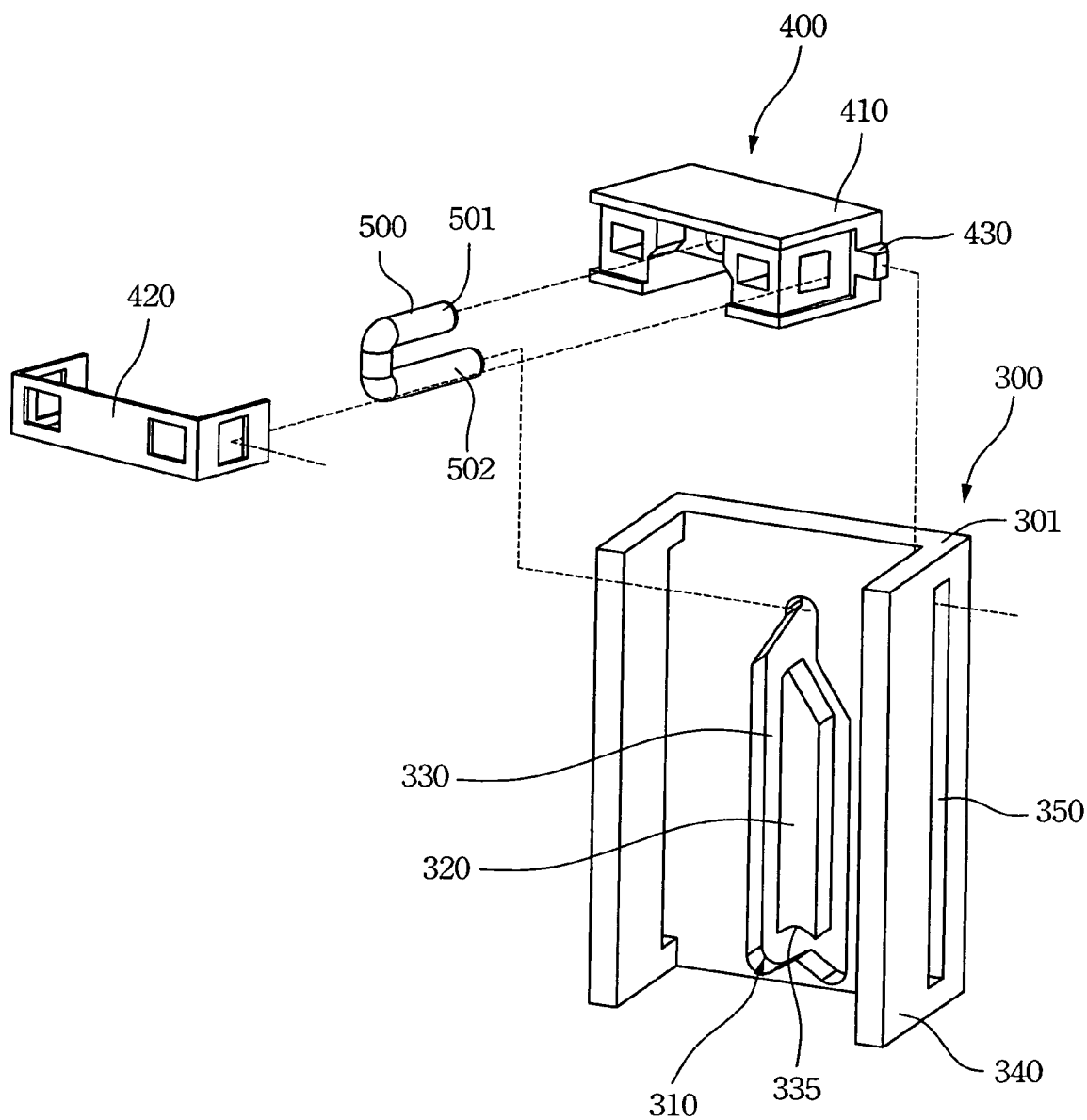
FIG. 2 is an exploded view of partial elements in the practice of the latch structure of the present invention.
Figure 3:
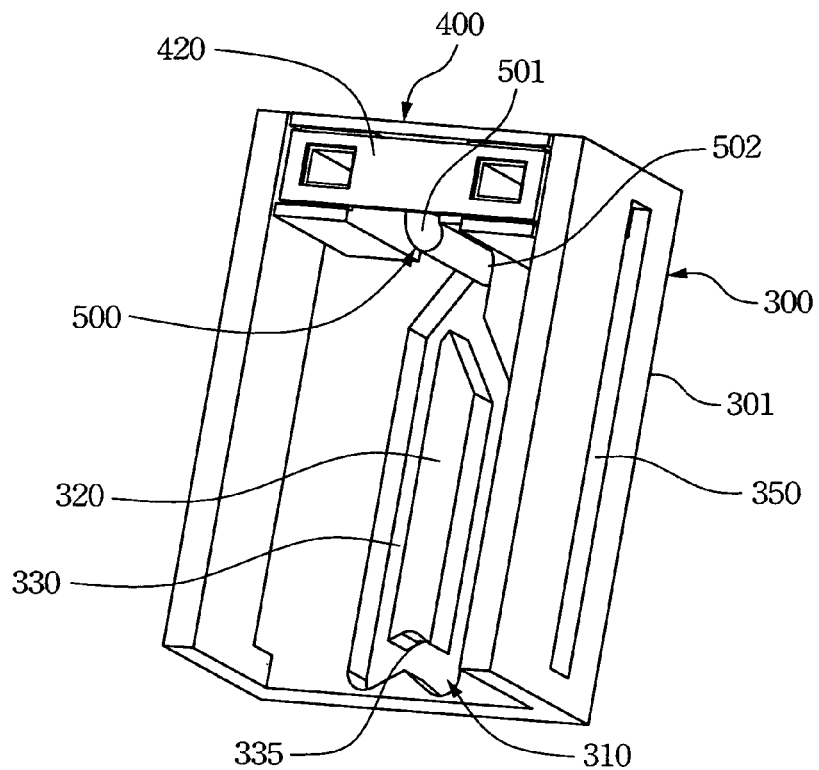
FIG. 3 is an assembling view of the partial elements in the practice of the latch structure of the present invention.

Refer to FIG. 2 and FIG. 3. FIG. 2 and FIG. 3 are an exploded view and an assembling view of partial elements in the practice of the latch structure of the present invention. Each of the side bases 300 can be made as an independent device (see FIG. 2), or integrally made as one-piece element with an inner sidewall of the house 600 in the space 610 (not shown).

In the FIG. 2, when the side base 300 is made as an independent device (see FIG. 2), the side base 300 comprises a base body 301, a fillister 310, an island 320, a driven element 400, and a "U" type rod 500.

The fillister 310 is formed on one surface of the base body 301 facing to another base body 301. The island 320 is centralized in the fillister 310 to form a loop track 330 disposed between the fillister 310 and the island 320. Also, the loop track 330 has a stopper 335. The stopper 335 is disposed in the loop track 330 far away from the opening of the space 610.

The driven element 400 is disposed between the platform 100 and the base body 301, and physically connects one of the edges 102 of the platform 100. The "U" type rod 500 is a rod with a "U" or "J" shape, and has a first end 501 and a second end 502 thereof. The first end 501 of the "U" type rod 500 is pivotally connected to the driven element 400, and the second end 502 of the "U" type rod 500 is a free end extending into the loop track 330.

When the platform 100 is pressed from the original location, the driven element 400 and the "U" type rod 500 will be driven to move together, and the second end 502 of the "U" type rod 500 in the loop track 330 will move along the loop track 330 in which the loop track 330 will rotate the "U" type rod 500 to meet different directions of the loop track 330 for smoothly going along the loop track 330. When the second end 502 thereof arrives to the stopper 335, the "U" type rod 500, the driven element 400 and the platform 100 are all fastened by the stopper 335 (see FIG. 4).

After that, when the platform 100 is pressed again, and the second end 502 thereof leaves the stopper 335, the elastic restorable element 200 carries the "U" type rod 500, the driven element 400 and the platform 100 back to the original location (see FIG. 1B).

Refer to FIG. 2 again. The side base 300 further has two flanges 340 respectively extending from two opposite edges of the base body 301 towards a same direction. Thus, a cross-section of the base body 301 appears as a "U" shape profile. Furthermore, each of the flanges 340 respectively has a guiding ditch 350 thereon.

The driven element 400 has a main body 410 and a lid 420. The driven element 400 is movably disposed between the flanges 340 in which the driven element 400 has two bumps 430 disposed respectively on two opposite sides of the main body 410, and each bump 430 engages one of the guiding ditches 350. Therefore, the driven element 400 will not depart from the side bases 300.

The first end 501 of "U" type rod 500 is pivoted and contained in the main body 410, and the lid 420 covers the main body 410 for holding the "U" type rod 500 on the main body 410. The driven element 400 physically connects the edges 102 of the platform 100 via the lid 420.

Refer to FIG. 1A again. For example, the mentioned elastic restorable element 200 can be a constant force spring. The constant force spring is substantially formed by an elastic leaf. The elastic leaf has two ends and a middle part between the ends of the elastic leaf. The ends thereof are respectively elastically curled and pivoted to the mentioned fixed element such as the housing 600 in this embodiment, and the middle part is served for elastically pulling down and connects to a lug 110 of another edge 102 of the platform 100 other from the one connecting to the lid 420.

Therefore, when the platform 100 is pressed into the space 610, the middle part of the elastic leaf is elastically extended towards the space 610 by the lug 110 of the platform 100, and the ends of the elastic leaf are elastically stretched to store elastic forces.

When the platform 100 is pressed again to move back to the original location (e.g. the opening of the space 610), the ends of the elastic leaf are curled again by the released elastic forces, and the middle part of the elastic leaf is shrunk elastically to carry the lug 110 of the platform 100 towards the original location. Since the constant force spring does not locate on the way of the traveling path of the platform 100 or the driven element 400, room for the compressed spring on the traveling path of the platform 100 or the driven element 400 is needed no more, when the latch structure of the present invention is in design. Thus, the depth of the space 610 and the dimension of the side bases 300 can be downsized, and the size of the latch structure and the housing 600 can further be improved in effect.

The mentioned constant force spring above is only for exemplary demonstration, not limited in the present invention. Other types of the elastic restorable element 200 such as a compression spring, a pulling spring, a torsion spring, and the combination can be implemented as the elastic restorable element 200. A person who skills in the related art may flexibly select a type of the elastic restorable element 200 in accordance with the feasible situations.

Figure 5:
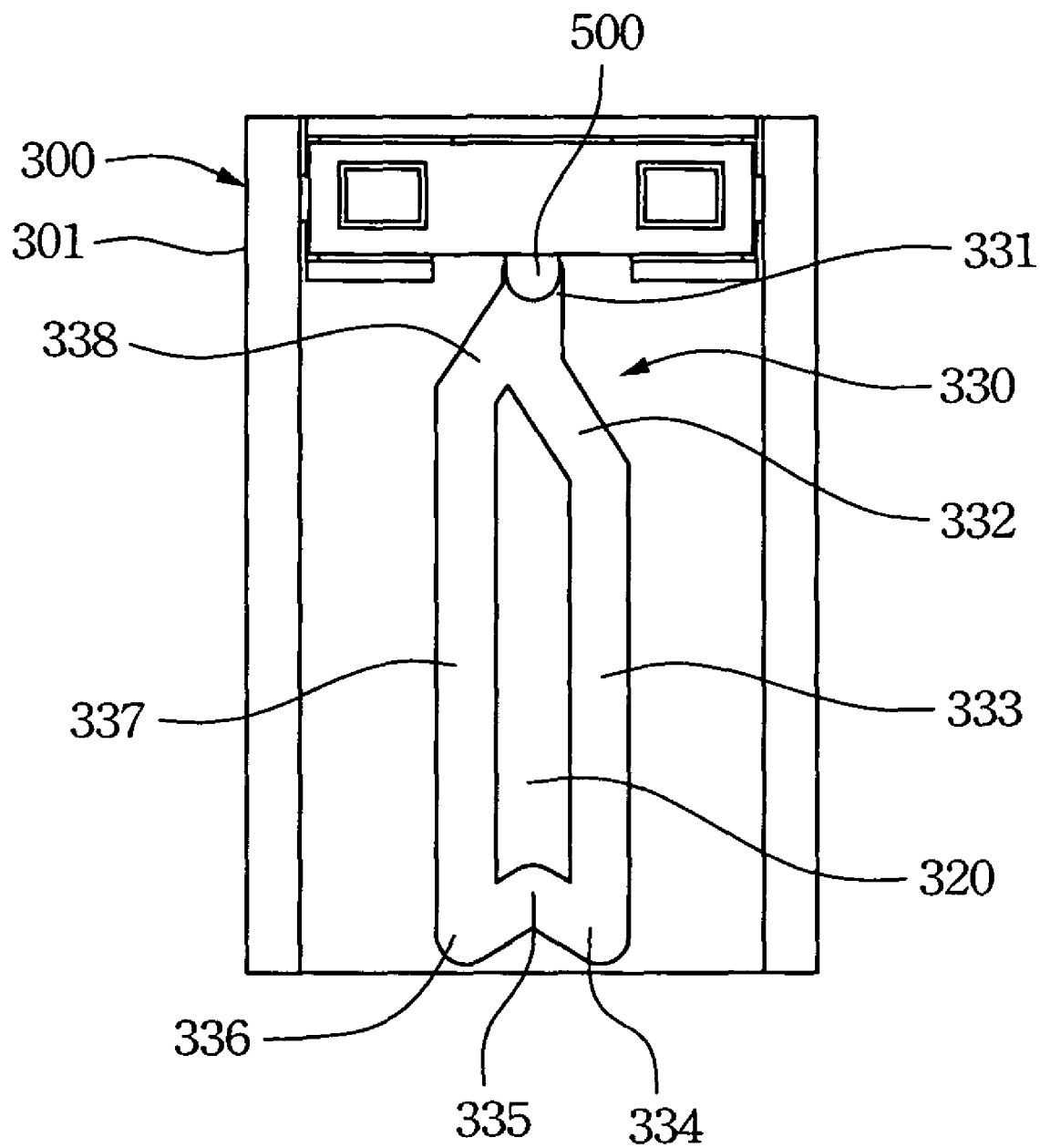
FIG. 5 is a front view of FIG. 3 of the practice of the latch structure.

Refer to FIG. 5. FIG. 5 is a front view of FIG. 3 of the practice of the latch structure. The embodiment also discloses a design of the loop track 330. The loop track 330 in clockwise sequentially comprises a starting point 331, a first detouring path 332, a first straight path 333, a second detouring path 334, the mentioned stopper 335, a third detouring path 336, a second straight path 337, and a fourth detouring path 338.

Furthermore, a different height design or a slope design can be adopted on an intersection between the straight path and detouring path in the loop track 330 to form a "one-way path"

characteristic on the loop track 330, thus, avoiding the second end 502 of the "U" type rod 500 reversely moving along the loop track 330.

Figure 4:
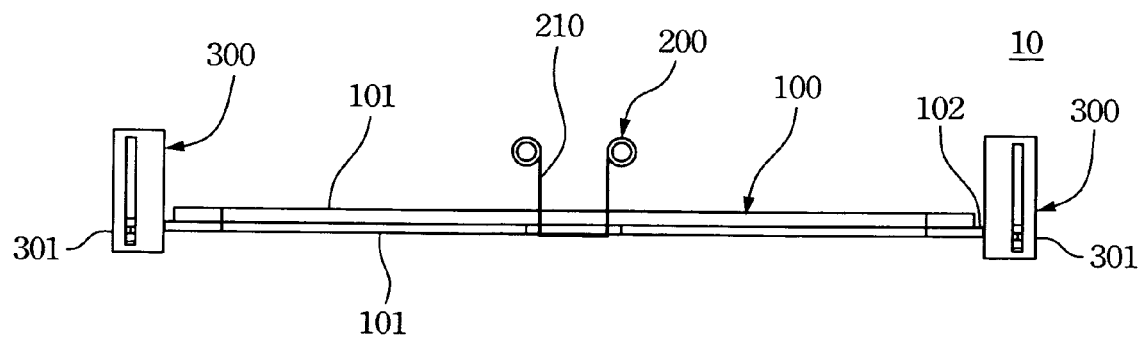
FIG. 4 is a manipulated schematic view in the practice of the latch structure of the present invention.

Refer to FIG. 1A, FIG. 4, and FIG. 5 again. When a force straightly presses the platform 100 into the space 610, the platform 100 drives the driven element 400, and the "U" type rod 500 to move together. At first, the second end 502 thereof is moved from the starting point 331 to the first detouring path 332. Then, the first detouring path 332 guides the second end 502 to move along the first detouring path 332 to arrive to the first straight path 333. Then, the first straight path 333 guides the second end 502 to move along the first straight path 333 to arrive to the second detouring path 334. Then, the second detouring path 334 guides the second end 502 to move along the second detouring path 334 to arrive to the mentioned stopper 335.

When the force is gone, the second end 502 thereof is fastened on the mentioned stopper 335, so does the driven element 400, and the platform 100 (see FIG. 4 and FIG. 5).

Refer to FIG. 1A, FIG. 4, and FIG. 5 again. When another force straightly presses the platform 100 towards the space 610 again, the platform 100 drives the driven element 400, and the "U" type rod 500 to move together. The second end 502 thereof is moved from the mentioned stopper 335 to the third detouring path 336. Then, the third detouring path 336 guides the second end 502 to fit the second straight path 337.

When another force is gone, the elastic restorable element 200 carries the platform 100, the driven element 400 and the "U" type rod 500 to move together. At first, the second end 502 thereof is carried to arrive to the fourth detouring path 338 along the second straight path 337. Then, the second straight path 337 guides the second end 502 to move along the second straight path 337 to arrive to the fourth detouring path 338. Finally, the fourth detouring path 338 guides the the second end 502 to return the starting point 331. Thus, the platform 100 and the driven element 400 are both carried back to the original location.

To sum up, due to features of the elements and the sub-combinations described in the practice of the present invention, the article placed on the platform 100 can be contained or disclosed from the space 610, when the push-lock and push-release type of latch structure 10 is manipulated.

Also, since the elastic restorable element 200 does not locate in the traveling path of the platform 100, the depth of the space 610 and the dimension of the side bases 300 can be downsized, and the size of the latch structure and the housing 600 can further be improved in effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A push-lock and push-release type of latch structure, comprising:
    a platform having first and second opposite edged and at least a third edge perpendicular to the first and second opposite edges;
    at least one elastic restorable element connected to the third edge of the platform; and
    plural side bases respectively disposed on the first and second opposite edges of the platform, each of the side bases comprising:
    a base body comprising two flanges respectively extending from two opposite edges of the base body towards a same direction, each of the flanges respectively having a guiding ditch thereon;
    a loop track disposed on the base body, and having a stopper therein;
    a driven element disposed between the platform and the base body, and being movable with the platform and connected with one of the first and second opposite edges; and
    a "U" shaped rod pivotally connected to the driven element at a first end thereof, and extending into the loop track at a second end thereof.

2. The push-lock and push-release type of latch structure of claim 1, wherein each of the side bases further comprises:
    a fillister formed on one surface of the base body facing to another side base; and
    an island centralized in the fillister, wherein the loop track is formed between the fillister and the island.

3. The push-lock and push-release type of latch structure of claim 1, wherein the driven element is movably disposed between the flanges, and has two bumps disposed respectively on two opposite sides thereof, and each of the bumps engages one of the guiding ditches.

4. The push-lock and push-release type of latch structure of claim 1, wherein a direction of a traveling path of the platform is the same as a direction that one surface of the platform faces.

5. The push-lock and push-release type of latch structure of claim 1, wherein the elastic restorable element is a constant force spring having an elastic leaf with two ends thereof and a middle part disposed between the ends,
    wherein the ends thereof are respectively elastically curled, and the middle part serves for elastically pulling and is connected to a lug disposed on the edge of the platform.

6. The push-lock and push-release type of latch structure of claim 1, wherein the driven element comprises:
    a main body for containing the first end of the "U" type rod; and
    a lid covering the main body for holding the "U" type rod in the main body.

7. The push-lock and push-release type of latch structure of claim 2, wherein the loop track in clockwise sequentially comprises a starting point, a first detouring path, a first straight path, a second detouring path, the stopper, a third detouring path, a second straight path, and a fourth detouring path.

8. An electronic device comprising:
    a housing having a space; and
    a push-lock and push-release type of latch structure disposed in the space, comprising:
    a platform having first and second opposite edged and at least a third edge perpendicular to the first and second opposite edges;
    at least one elastic restorable element connected to the third edge of the platform; and
    plural side bases respectively disposed on the first and second opposite edges of the platform, each of the side bases comprising:
    a base body comprising two flanges respectively extending from two opposite edges of the base body towards a same direction, each of the flanges respectively having a guiding ditch thereon;
    a loop track disposed on the base body, and having a stopper therein;

a driven element disposed between the platform and the base body, and being movable with the platform and connected with one of the first and second opposite edges; and a "U" shaped rod pivotally connected to the driven element at a first end thereof, and extending into the loop track at a second end thereof.

9. The electronic device of claim 8, wherein the driven element is movably disposed between the flanges, and has two bumps disposed respectively on two opposite sides thereof, and each of the bumps engages one of the guiding ditches.

10. The electronic device of claim 8, wherein a direction of a traveling path of the platform is the same as a direction that one surface of the platform faces.

11. The electronic device of claim 8, wherein the elastic restorable element is a compression spring, a pulling spring, a torsion spring, or a constant force spring.

12. The electronic device of claim 8, wherein the elastic restorable element has an elastic leaf with two ends thereof and a middle part between the ends thereof, wherein the ends thereof are respectively elastically curled and pivoted on the housing, and the middle part serves for elastically pulling, and is connected to the edge of the platform.

13. The electronic device of claim 8, wherein the driven element comprises:

a main body for containing the first end of the "U" type rod; and a lid covering the main body for holding the "U" type rod in the main body.

14. The electronic device of claim 13, wherein the elastic restorable element comprises an elastic leaf having two ends thereof and a middle part between the ends thereof, wherein the ends of the elastic leaf are respectively elastically curled and pivoted on the housing, and the middle part serves for elastically pulling, and is connected to an edge of the platform.

15. A side base implemented to a push-lock and push-release type of latch structure, the side base comprising:

a base body comprising two flanges respectively extending from two opposite edges of the base body towards a same direction, each of the flanges respectively having a guiding ditch thereon;

a fillister formed on one surface of the base body;

an island centralized in the fillister to form a loop track between the fillister and the island;

a driven element movably disposed on one side of the base body having the loop track, the driven element comprising two bumps disposed respectively on two opposite sides thereof, each of the bumps engaging one of the guiding ditches; and a "U" shaped rod pivotally connected to the driven element at a first end thereof, and extending into the loop track at a second end thereof, wherein the loop track at least has two detouring paths and a stopper.

* * * * *